US012801348B2

(12) United States Patent
Ambrogio et al.

(10) Patent No.: US 12,801,348 B2
(45) Date of Patent: Nov. 17, 2026

(54) FIXED ASYMMETRY COMPENSATION FOR MULTIPLY AND ACCUMULATE OPERATIONS

(71) Applicant: International Business Machines Corporation, Armonk, NY (US)

(72) Inventors: Stefano Ambrogio, San Jose, CA (US); Pritish Narayanan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1013 days.

(21) Appl. No.: 18/078,212

(22) Filed: Dec. 9, 2022

(65) Prior Publication Data

US 2024/0192921 A1 Jun. 13, 2024

(51) Int. Cl.
*G06F 7/544* (2006.01)

(52) U.S. Cl.
CPC .................................. *G06F 7/5443* (2013.01)

(58) Field of Classification Search
CPC ...... G06F 7/5443; G06N 3/065; G06N 3/063; G06N 3/04
See application file for complete search history.

(56) References Cited

U.S. PATENT DOCUMENTS 11,074,499 B2 7/2021 Burr
11,605,430 B2 * 3/2023 Prakash ............. G11C 16/0483
12,190,993 B2 * 1/2025 Kale ..................... G06F 7/5443
12,327,181 B2 * 6/2025 Kwon .................... G06N 3/065
12,525,289 B2 * 1/2026 Ezzadeen ............ G06F 15/7821
2018/0174024 A1 6/2018 Lin et al.
2019/0034788 A1 1/2019 Burr
(Continued)

FOREIGN PATENT DOCUMENTS

CN 111460365 A 7/2020
CN 120322776 A 7/2025
(Continued)

OTHER PUBLICATIONS

Amirsoleimani et al., "Mitigating State-Drift in Memristor Crossbar Arrays for Vector Matrix Multiplication", DOI: 10.5772/intechopen.100246 (Year: 2021).*
(Continued)

*Primary Examiner* — Andrew Caldwell
*Assistant Examiner* — Kenny K. Bui
(74) *Attorney, Agent, or Firm* — SCULLY, SCOTT, MURPHY & PRESSER, P.C.; Edward Wixted

(57) ABSTRACT

Systems and methods for compensating multiply and accumulate (MAC) operations are described. A processor can send an input vector to a first portion of a memory device. The first portion can store synaptic weights of a trained artificial neural network (ANN). The processor can read a first result of a MAC operation performed on the input vector and the synaptic weights stored in the first portion. The processor can send an inverse of the input vector to a second portion of the memory device. The processor can read a second result of a MAC operation performed on the inverse of the input vector and an inverse of synaptic weights stored in the second portion. The processor can combine the first result and the second result to generate a final result. The final result can be a compensated version of the first result.

17 Claims, 6 Drawing Sheets

(56) References Cited

U.S. PATENT DOCUMENTS

| | | | | |
|---|---|---|---|---|
| 2020/0134438 | A1 | 4/2020 | Osborne et al. | |
| 2021/0012202 | A1 | 1/2021 | Venkatesh et al. | |
| 2022/0391681 | A1 | 12/2022 | Gokmen et al. | |
| 2024/0037380 | A1 * | 2/2024 | Henderson | G06N 3/09 |

FOREIGN PATENT DOCUMENTS

| | | | | |
|---|---|---|---|---|
| DE | 112023004197 | T5 | 8/2025 | |
| WO | WO-2019097494 | A1 * | 5/2019 | G06N 3/065 |
| WO | 2021238568 | A1 | 12/2021 | |
| WO | 2024/119839 | A1 | 6/2024 | |

OTHER PUBLICATIONS

Q. Liu et al., "33.2 A Fully Integrated Analog ReRAM Based 78.4TOPS/W Compute-In-Memory Chip with Fully Parallel MAC Computing," 2020 IEEE International Solid-State Circuits Conference—(ISSCC), pp. 500-502, doi: 10.1109/ISSCC19947.2020.9062953. (Year: 2020).*

International Search Report And Written Opinion dated Oct. 31, 2023 received in PCT Patent Application No. PCT/CN2023/108568.

* cited by examiner

FIXED ASYMMETRY COMPENSATION FOR MULTIPLY AND ACCUMULATE OPERATIONS

BACKGROUND

The present application relates generally to analog memory-based artificial neural networks and more particularly to techniques that compensate fixed asymmetries for multiply and accumulate operations.

Artificial neural networks (ANNs) can include a plurality of node layers, such as an input layer, one or more hidden layers, and an output layer. Each node can connect to another node, and has an associated weight and threshold. If the output of any individual node is above the specified threshold value, that node is activated, sending data to the next layer of the network. Otherwise, no data is passed along to the next layer of the network. ANNs can rely on training data to learn and improve their accuracy over time. Once an ANN is fine-tuned for accuracy, it can be used for inference (e.g., classifying and predicting input data).

Analog memory-based neural network may utilize, by way of example, storage capability and physical properties of memory devices to implement an artificial neural network. This type of in-memory computing hardware increases speed and energy efficiency, providing potential performance improvements. Rather than moving data from memory devices to a processor to perform a computation, analog neural network chips can perform computation in the same place (e.g., in the analog memory) where the data is stored. Because there is no movement of data, tasks can be performed faster and require less energy.

BRIEF SUMMARY

The summary of the disclosure is given to aid understanding of a system and method of compensating fixed asymmetries for multiply and accumulate (MAC) operations in analog memory-based artificial neural networks, which can provide efficiency, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or their method of operation to achieve different effects.

In one embodiment, a memory device for compensating multiply and accumulate (MAC) operations is generally described. The memory device can include a plurality of memory elements arranged into a plurality of memory blocks. Each memory block can include a first set of memory elements of the plurality of memory elements and a second set of memory elements of the plurality of memory elements. The first set of memory elements can be configured to store a synaptic weight of a trained artificial neural network (ANN). The second set of memory elements can be configured to store an inverse of the synaptic weight stored in the first set of memory elements.

Advantageously, the memory device in an aspect can compensate fixed asymmetries, and improve an accuracy, of MAC operations.

In one embodiment, a method for compensating multiply and accumulate (MAC) operations is generally described. The method can include sending an input vector to a first portion of a memory device. The first portion can store synaptic weights of a trained artificial neural network (ANN). The method can further include reading a first result of a multiply and accumulate (MAC) operation performed on the input vector and the synaptic weights stored in the first portion. The method can further include sending an inverse of the input vector to a second portion of the memory device. The method can further include reading a second result of a MAC operation performed on the inverse of the input vector and an inverse of synaptic weights stored in the second portion. The method can further include combining the first result and the second result to generate a final result. The final result can be a compensated result of the MAC operation performed on the input vector and the synaptic weights stored in the first portion.

Advantageously, the method in an aspect can compensate fixed asymmetries, and improve an accuracy, of MAC operations.

In one embodiment, a system for compensating multiply and accumulate (MAC) operations is generally described. The system can include a memory device and a processor. The processor can be configured to send an input vector to a first portion of the memory device. The first portion can store synaptic weights of a trained artificial neural network (ANN). The processor can be further configured to read a first result of a multiply and accumulate (MAC) operation performed on the input vector and the synaptic weights stored in the first portion. The processor can be further configured to send an inverse of the input vector to a second portion of the memory device. The processor can be further configured to read a second result of a MAC operation performed on the inverse of the input vector and an inverse of synaptic weights stored in the second portion. The processor can be further configured to combine the first result and the second result to generate a final result. The final result can be a compensated result of the MAC operation performed on the input vector and the synaptic weights stored in the first portion.

Advantageously, the system in an aspect can compensate fixed asymmetries, and improve an accuracy, of MAC operations.

Further features as well as the structure and operation of various embodiments are described in detail below with reference to the accompanying drawings. In the drawings, like reference numbers indicate identical or functionally similar elements.

DETAILED DESCRIPTION

Analog neural network chips can perform parallel vector-multiply operations, such as multiply and accumulate (MAC) operations. An analog neural network chip can receive input data that can be excitation vectors. These excitation vectors can be applied onto multiple row-lines of the analog neural network chip in order to perform MAC operations across a matrix of stored weights encoded into conductance values of the analog memory elements. In an aspect, analog memory elements in the analog neural network chip can be sensitive to fixed asymmetries, including but not limited to shift between positive and negative weights, positive and negative inputs, or peripheral circuit asymmetries. These fixed asymmetries can impact accuracy of the MAC operation computation.

Figure 1:
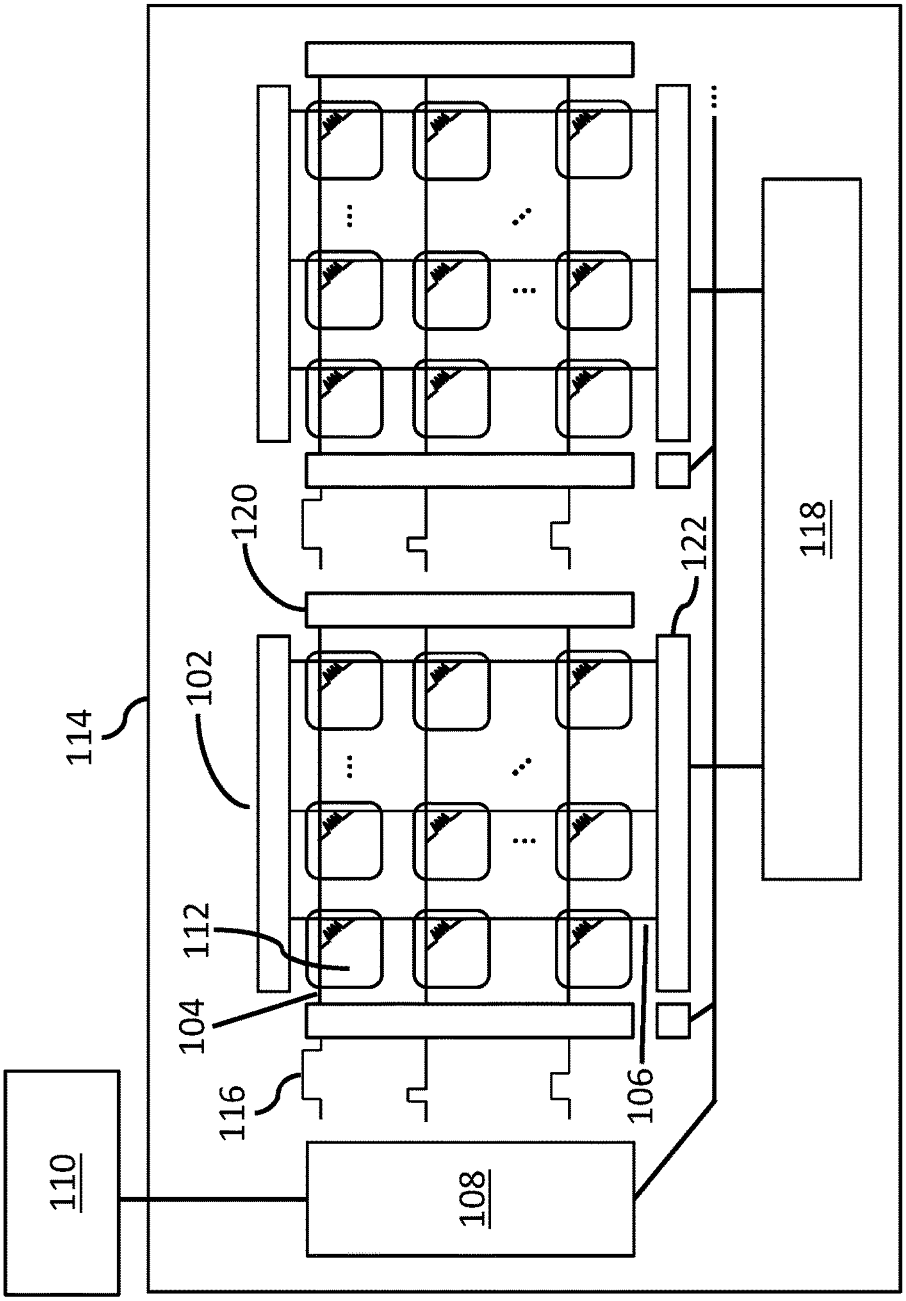
FIG. 1 is a diagram illustrating an example that can implement fixed asymmetry compensation for multiply and accumulate operations in one embodiment.

FIG. 1 is a diagram illustrating analog memory-based devices implementing a hardware neural network in an embodiment. An analog memory-based device 114 ("device 114") is shown in FIG. 1. Device 114 can be a co-processor or an accelerator, and device 114 can sometimes be referred to as an analog fabric (AF) engine. One or more digital processors 110 can communicate with device 114 to facilitate operations or functions of device 114. In one embodiment, digital processor 110 can be a field programmable gate array (FPGA) board. Device 114 can also be interfaced to components, such as digital-to-analog converters (DACs), that can provide power, voltage and current to device 114. Digital processor 110 can implement digital logic to interface with device 114 and other components such as the DACs.

In an embodiment, device 114 can include a plurality of multiply accumulate (MAC) hardware having a crossbar structure or array. There can be multiple crossbar structure or arrays, which can be arranged as a plurality of tiles, such as a tile 102. While FIG. 1 shows two MAC hardware (two tiles), there can be additional (e.g., more than two) MAC tiles integrated in device 114. By way of example, tile 102 can include electronic devices such as a plurality of memory elements 112. Memory elements 112 can be arranged at cross points of the crossbar array. At each cross point or junction of the crossbar structure or crossbar array, there can be at least one memory element 112 including an analog memory element such as resistive RAM (ReRAM), conductive-bridging RAM (CBRAM), NOR flash, magnetic RAM (MRAM), and phase-change memory (PCM). In an embodiment, such analog memory element can be programmed to store synaptic weights values of an artificial neural network (ANN).

In an aspect, each tile 102 can represent at least a portion of a layer of an ANN. Each memory element 112 can be connected to a respective one of a plurality of input lines 104 and to a respective one of a plurality of output lines 106. Memory elements 112 can be arranged in an array with a constant distance between crossing points in a horizontal and vertical dimension on the surface of a substrate. Each tile 102 can perform vector-matrix multiplication. By way of example, tile 102 can include peripheral circuitry such as pulse width modulators at 120 and peripheral circuitry such as readout circuits 122.

Electrical pulses 116 or voltage signals can be input (or applied) to input lines 104 of tile 102. Output currents can be obtained from output lines 106 of the crossbar structure, for example, according to a multiply-accumulate (MAC) operation, based on the input pulses or voltage signals 116 applied to input lines 104 and the values (synaptic weights values) stored in memory elements 112.

Tile 102 can include N input lines 104 and M output lines 106. A controller 108 (e.g., global controller) can program memory elements 112 to store synaptic weights values of an ANN, for example, to have electrical conductance (or resistance) representative of such values. Controller 108 can include (or can be connected to) a signal generator (not shown) to couple input signals (e.g., to apply pulse durations or voltage biases) into the input lines 104 or directly into the outputs.

In an embodiment, readout circuits 122 can be connected or coupled to read out the M output signals (electrical currents) obtained from the M output lines 106. Readout circuits 122 can be implemented by a plurality of analog-to-digital converters (ADCs). Readout circuit 122 may read currents as directly outputted from the crossbar array, which can be fed to another hardware or circuit 118 that can process the currents, such as performing compensations or determining errors.

Processor 110 can be configured to input (e.g., via the controller 108) a set of input activation vectors into the crossbar array. In one embodiment, the set of input activation vectors, which is input into tile 102, is encoded as electrical pulse durations. In another embodiment, the set of input activation vectors, which is input into tile 102, can be encoded as voltage signals. Processor 110 can also be configured to read, via controller 108, output activation vectors from the plurality of output lines 106 of tile 102. The output activation vectors can represent outputs of operations (e.g., MAC operations) performed on the crossbar array based on the set of input activation vectors and the synaptic weight stored in memory elements 112. In an aspect, the input activation vectors get multiplied by the value (e.g., synaptic weight) stored on memory elements 112 of tile 102, and the resulting products are accumulated (added) column-wise to produce output activation vectors in each one of those columns (output lines 106). These output activation vectors can further pass through a respective activation function for activating a respective neurons.

Further, processor 110 can be further configured to train an ANN by adjusting the synaptic weights values, of the ANN, stored in the crossbar array. Processor 110 can repeatedly adjust the synaptic weights values stored in the crossbar array until the error between the expected outcome and a predicted outcome by the ANN converges to a target accuracy. Once the error converges to the target accuracy, processor 110 can deploy the ANN to perform inference, such as classifying or predicting input data. In an aspect, once the ANN is deployed, the synaptic weights values stored in the crossbar array can remain fixed or unchanged. However, the synaptic weights values stored in the crossbar array can be adjustable if the ANN is being retrained using new training data.

Figure 2:
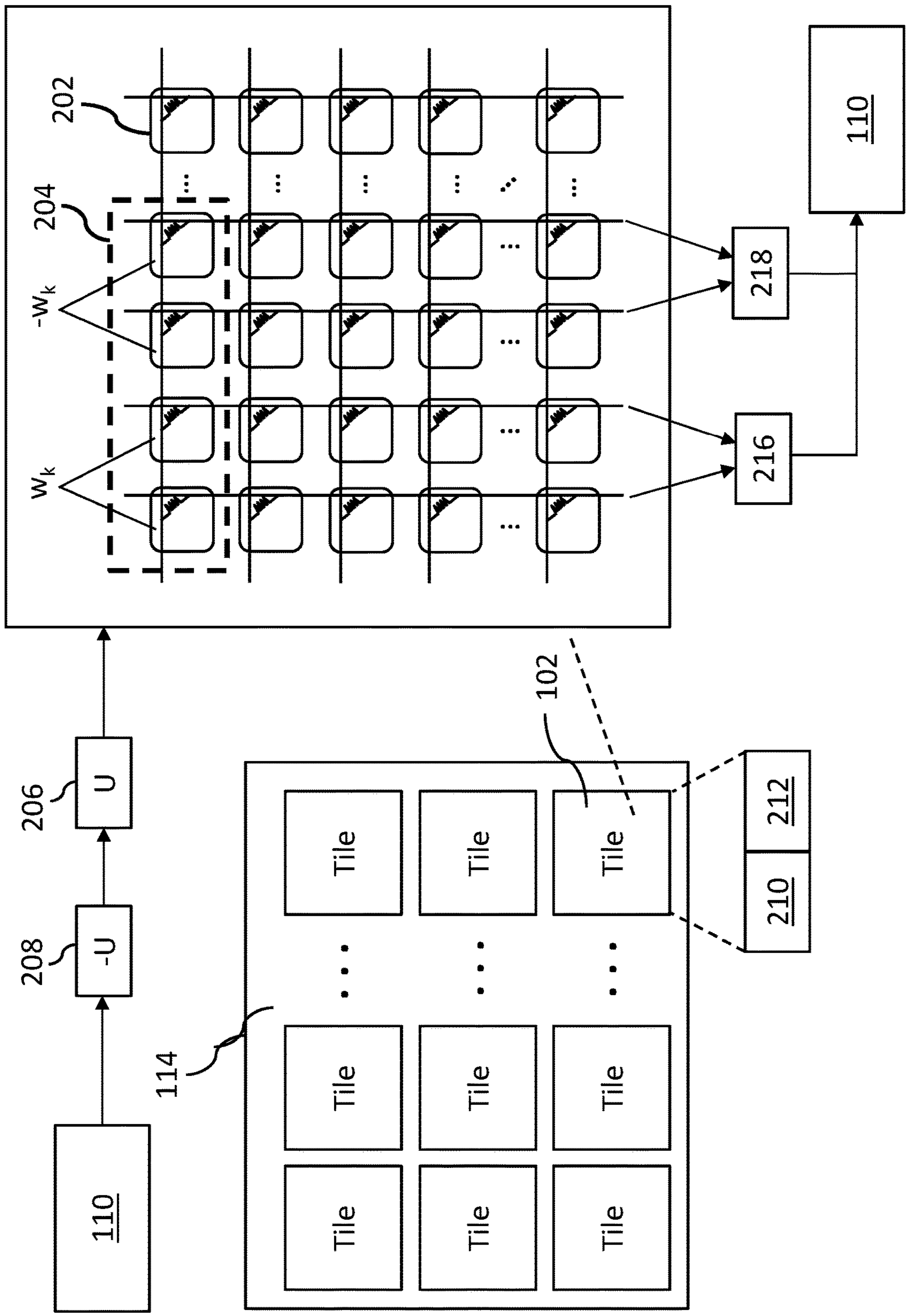
FIG. 2 is a diagram illustrating details of an analog memory-based device that can implement fixed asymmetry compensation for multiply and accumulate operations in one embodiment.

FIG. 2 is a diagram illustrating details of an analog memory-based device that can implement fixed asymmetry compensation for multiply and accumulate operations in one embodiment. In an embodiment shown in FIG. 2, each one of tiles 102 in device 114 can include a first portion 210 and a second portion 212. Further, each one of tiles 102 can include a plurality of memory elements 202 arranged into a plurality of memory blocks 204. Each memory block 204 can include at least two memory elements 202. In one embodiment, each memory block 204 can include a first set of memory elements configured to store a synaptic weight $w_k$ of a trained ANN, and a second set of memory elements configured to store an inverse of the synaptic weight $w_k$, labeled as $-w_k$. The memory elements storing synaptic weights values $w_k$ can form the first portion 210, and the memory elements storing the inverse values $-w_k$ can form the second portion 212. In the embodiment shown in FIG. 2, a first set of memory elements in memory block 204 can include a pair of memory elements (e.g., two memory elements) storing $w_k$, and a second set of memory element in a memory block 204 can include a pair of memory elements (e.g., two memory elements) storing $-w_k$. In embodiments where two memory elements are storing one synaptic weight value (or one inverse value), the synaptic weight value (or the inverse value) can be represented by a difference between the conductance of the two memory elements. In another embodiment, the first set of memory elements in memory block 204, and the second set of memory element, can each include one memory element such that a synaptic weight value and its inverse value are each represented by an individual conductance. The number of memory elements in the memory first set of memory elements and the second set of elements can be arbitrary, where for example, the first set of memory elements and the second set of memory elements include the same number of memory elements. For example, other configurations of memory elements can be contemplated. The synaptic weights values $w_k$ can be fixed such that input data being inputted at row lines of tile 102 can be multiplied with the stored fixed weights $w_k$, and sum of the products of each row can be accumulated and outputted from the column lines of the tile 102.

The plurality of memory elements 202 can be analog non-volatile memory elements, such as resistive random-access memory (RRAM), conductive bridging random access memory (CBRAM), ferroelectric field-effect transistors (FeFET), ferroelectric tunneling junction, or electro-chemical random-access memory (ECRAM). If a tile 102 has N rows of memory elements 202 and M columns of memory elements 202, then tile 102 can include N×M/4 memory blocks 204 and tile 102 can store N×M/4 synaptic weights values.

In one embodiment, processor 110 can sequentially enable first portion 210 and second portion 212 of memory elements 202 in tile 102. Processor 110 can also sequentially provide input data to tile 102 for inference (e.g., classification, predicting, clustering, or other types of inference). By way of example, processor 110 can send control signals to enable first portion 210 of memory elements 202 that include columns of memory elements storing synaptic weights values $w_k$. If first portion 210 is enabled, then second portion 212 of memory elements 202 storing the inverse values $-w_k$ can be deactivated. First portion 210 and second portion 212 of memory elements 202 can be enabled separately, such that when first portion 210 is enabled by processor 110, second portion 212 is deactivated, and vice versa.

In one embodiment, in response to enabling first portion 210, processor 110 can provide first input data 206 representing a vector U to first portion 210. Memory elements among the enabled first portion 210 can receive input data 206 and perform a MAC operation on vector elements of vector U and synaptic weights values $w_k$. Processor 110 can read a result 216 of the MAC operation performed on input data 206 and synaptic weights values $w_k$ from first portion 210. In response to reading result 216, processor 110 can enable (or activate) second portion 212 of memory elements 202 and disable (or deactivate) first portion 210.

In response to enabling second portion 212, processor 110 can provide second input data 208 representing a vector −U to second portion 212. Vector −U can be an inverse of vector U, such that vector elements of vector −U can be inverse of a corresponding vector elements of vector U. Tile 102 can receive input data 208 and perform a MAC operation on vector elements of vector −U and the inverse values $-w_k$ stored in second portion 212. Processor 110 can read a result 218 of the MAC operation performed on input data 208 and inverse values $-w_k$ from second portion 212. Processor 110 can combine results 216, 218 to generate a final MAC operation result that can be a compensated version of result 216.

Figure 3A:
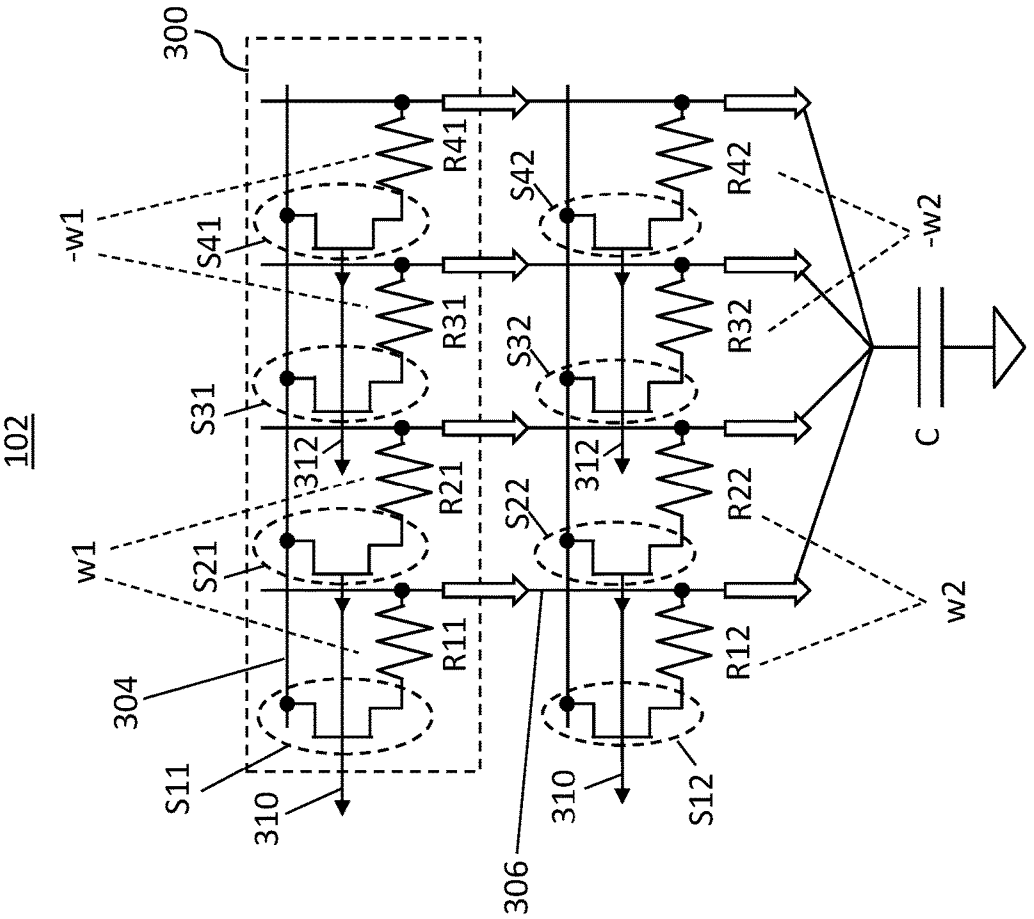
FIG. 3A is a diagram illustrating details of a tile that can implement fixed asymmetry compensation for multiply and accumulate operations in one embodiment.

FIG. 3A is a diagram illustrating details of a tile that can implement fixed asymmetry compensation for multiply and accumulate operations in one embodiment. A portion of a crossbar array in tile 102 is shown in FIG. 3A. In the embodiment shown in FIG. 3, each memory element 202 (shown in FIG. 2) can include an analog memory element, such as a resistor, and a switch (e.g., a metal-oxide-semiconductor field-effect transistor (MOSFET)). A memory block 300 (e.g., one of memory blocks 204 in FIG. 2) can include four memory elements and memory block 300 can be configured to store a synaptic weight value w1 and an inverse of w1, labeled as −w1. Column lines of the crossbar array in tile 102 can be connected to a capacitor C, where capacitance of capacitor C can represent outputs accumulated from columns of memory elements 202, and the accumulated outputs are results from a MAC operation.

By way of example, a switch S11 and a resistor R11 can form a first memory element in a memory block 300. A switch S21 and resistor R21 can form a second memory element in memory block 300. The first and second memory element in memory block 300 can be among first portion 210 of tile 102 (see FIG. 2) storing synaptic weights $w_k$. A switch S31 and a resistor R31 can form a third memory element in memory block 300, and a switch S41 and resistor R41 can form a fourth memory element in memory block 300. The third and fourth memory element in memory block 300 can be among second portion 212 of tile 102 (see FIG. 2) storing inverse values $-w_k$. Another memory block configured to store synaptic weight value w2 and inverse values −w2 can include memory elements having resistors R12, R22, R32, R42, and corresponding switches S12, S22, S32, S42.

Switches among first portion 210 can be connected to a control line 310. For example, gate terminals of switches S11, S21, S12, S22 can be connected to control line 310. Processor 110 can send control signals to switches among first portion 210 using control line 310 to enable or disable memory elements among first portion 210. Switches among second portion 212 can be connected to a control line 312. For example, gate terminals of switches S31, S41, S32, S42 can be connected to control line 312. Processor 110 can send control signals to switches among second portion 212 using control line 312 to enable or disable memory elements among second portion 212.

In one embodiment, for each memory element 202, the analog memory element (e.g., resistor) can be connected to a column line and the switch can be connected between the analog memory element and a row line. Using resistor R11 and switch S11 as an example, when switch S11 is enabled, resistor R11 remains connected to both the column line 306 and row line 304. When switch S11 is deactivated, resistor R11 is disconnected from row line 304 and current does now flow through resistor R11. In one embodiment, processor 110 can switch control lines 310, 312 on or off separately. By way of example, processor 110 can switch on control line 310 and switch off control line 312, and provide a control signal to the entire crossbar array, such that switches connected to control line 310 can be enabled by the control signal but switches connected to control line 312 are deactivated. Similarly, processor 110 can switch off control line 310 and switch on control line 312, and provide the control signal to the entire crossbar array, such that switches connected to control line 310 can be deactivated by the control signal but switches connected to control line 312 are enabled. Therefore, the separated control of gate terminals of the switches using different control lines 310, 312 can allow processor 110 to selectively enabled or disable first portion 210 and second portion 212.

Figure 3B:
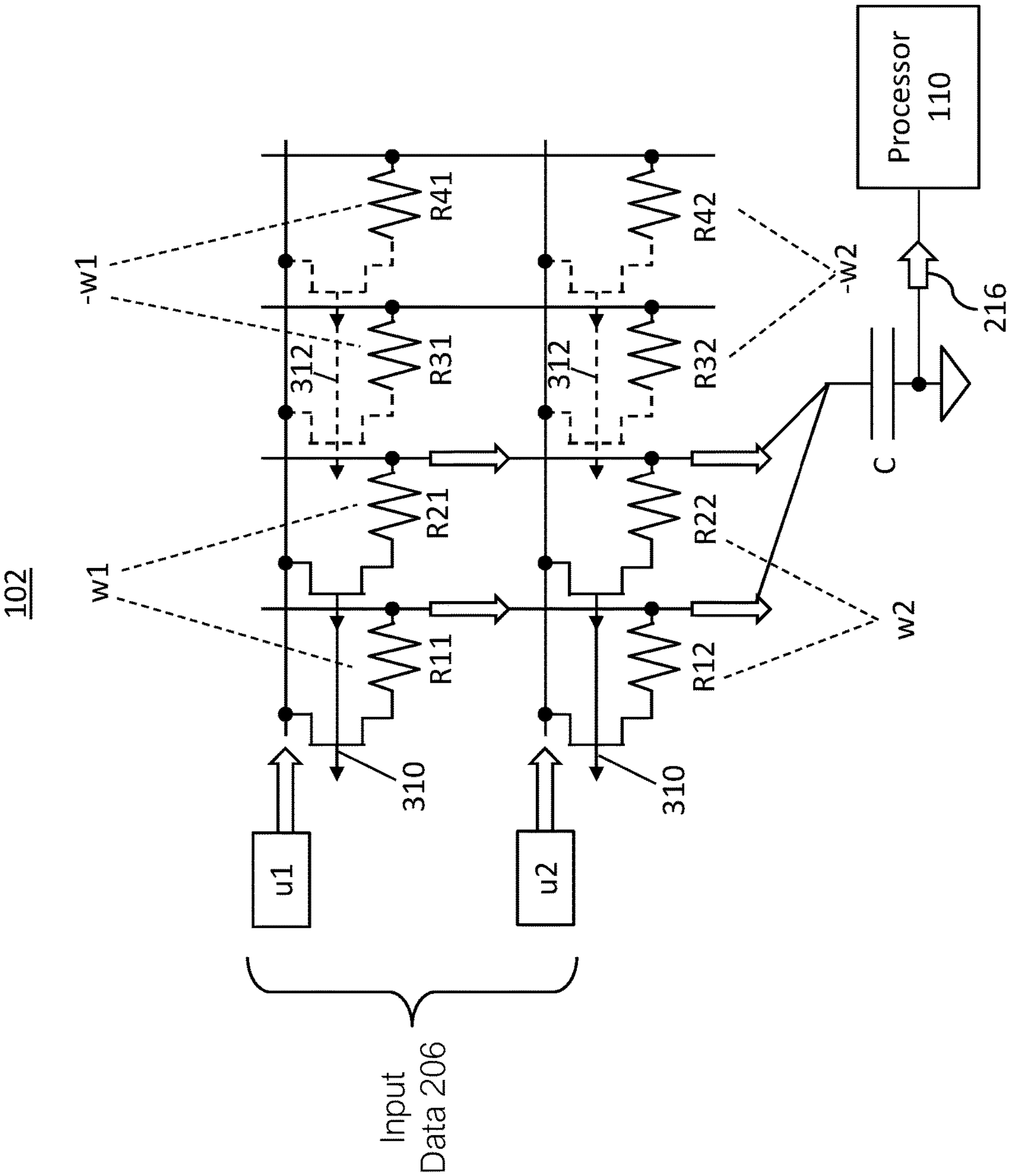
FIG. 3B is a diagram illustrating an example implementation of the tile shown in FIG. 3A in one embodiment.

FIG. 3B is a diagram illustrating an example implementation of the tile shown in FIG. 3A in one embodiment. In one embodiment, processor 110 can send a control signal on control line 310 to enable first portion 210 of memory elements 202. In response to first portion 210 being enabled, resistors R11, R21, R12, R22 can be connected to their respective column and row lines. Since control line 310 is separated from control line 312, processor 110 can send the control signal on control line 310 but not on control line 312 to selectively enable first portion 210 and disable second portion 212. In response to first portion 210 being enabled and second portion being deactivated, resistors R31, R41, R32, R42 can be disconnected from their respective row lines (e.g., disconnections being shown as dotted lines in FIG. 3B).

In response to enabling first portion 210, processor 110 can provide input data 206 to first portion 210 via row lines. Input data 206 can be an input that needs to undergo inference, such as classification and/or clustering, using synaptic weights values $w_k$. In the example shown in FIG. 3B, in response to enabling first portion 210, vector elements u1, u2 of input data 206 can be inputted to tile 102 and can be multiplied with synaptic weights values w1 and w2, respectively. Since second portion 212 is deactivated, vector elements u1, u2 will not reach the disconnected resistors R31, R41, R32, R42. Products of vector elements among input data 206 and synaptic weights values $w_k$ can be accumulated at capacitor C to generate result 216, where result 216 is a result of a MAC operation performed on input data 206 and synaptic weights values $w_k$. In one embodiment, control line 310 and control line 312 can be the same control line, and processor 110 can selectively connect or disconnect column lines with capacitor C. By way of example, processor 100 can connect column lines including resistors R11, R21, R12, R22 to capacitor C and disconnect column lines including resistors R31, R41, R32, R42 from capacitor C. Thus, even if u1, u2 reaches resistors R31, R41, R32, R42, the products u1(−w1) and u2(w2) will not be outputted to capacitor C.

Figure 3C:
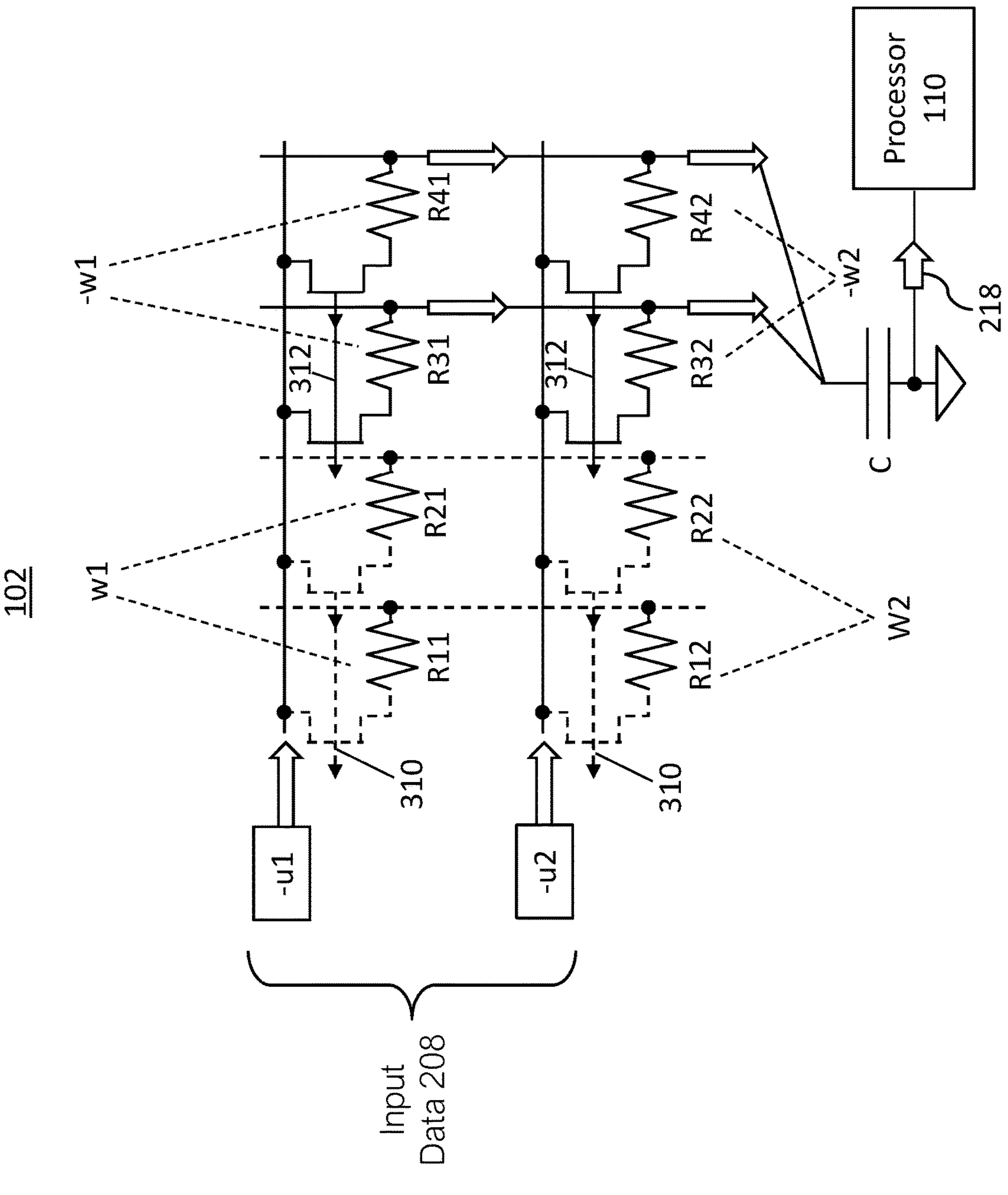
FIG. 3C is a diagram illustrating additional details of the example implementation of FIG. 3B in one embodiment.

FIG. 3C is a diagram illustrating additional details of the example implementation of FIG. 3B in one embodiment. In response to tile 102 outputting result 216, processor 110 can send another control signal on control line 312 to enable second portion 212. In response to second portion 212 being enabled, resistors R31, R41, R32, R42 can be connected to their respective column and row lines and first portion 210 can be deactivated. In response to second portion 212 being enabled and first portion 210 being deactivated, resistors R31, R41, R32, R42 can be disconnected from their respective row lines (e.g., disconnections being shown as dotted lines in FIG. 3C).

In response to enabling second portion 212, processor 110 can provide input data 208 to tile 102. Input data 208 can be an inverse of input data 206, thus can include vector elements −u1 and −u2. In the example shown in FIG. 3C, in response to enabling second portion 212, vector elements −u1, −u2 of input data 208 can be inputted to tile 102 and can be multiplied with inverse values −w1 and −w2, respectively. Since first portion 210 is deactivated, vector elements −u1, −u2 will not reach the disconnected resistors R11, R21, R12, R22. Products of vector elements among input data 208 and inverse values $-w_k$ can be accumulated at capacitor C to generate result 218, where result 218 is a result of a MAC operation performed on input data 208 and inverse values $-w_k$. Further, since vector elements −u1, −u2, and −w1, −w2, are negative values, products of vector elements among input data 208 and inverse values $-w_k$ can be positive values.

In response to completing a first MAC operation on input data 206 and synaptic weights values $w_k$ (see FIG. 3B), and completing a second MAC operation on input data 208 and inverse values $-w_k$, capacitor C can store a sum of result 216 and result 218. The sum of results 216, 218 can be read by processor 110 and processor 110 can determine a final result of the first MAC operation. By way of example, due to fixed asymmetries between analog memory elements (e.g., resistors) in first portion 210 and second portion 212, result 216 can be 1.9 and result 218 can be 2.1. Processor 110 can determine an average between 1.9 and 2.1 to determine a final result of 2.0. Hence, 2.0 can be a compensated version of the MAC operation result 216 that indicates 1.9. Result 216, without compensation from result 218, would deviate from the average of 2.0 by a deviation of −0.1.

Under ideal situations, results 216, 218 are identical because, for example, u1*w*1 is equivalent to (−u1)(−w1). However, results 216, 218 can be different from one another due to any fixed mismatch or asymmetries between positive or negative weights, positive or negative input, or peripheral circuitry (e.g., mismatches between the current paths of the first MAC operation and the second MAC operation). The systems and methods described herein can average out the differences since currents generated during the first MAC operations and currents generated during the second MAC operation to provide compensation for the fixed asymmetries. The storage of inverse values $-w_k$, and performing the second MAC operation on the inverse of an input and $-w_k$, can provide compensation to the first MAC operation and the compensation can improve an accuracy of the first MAC operation.

Figure 4:
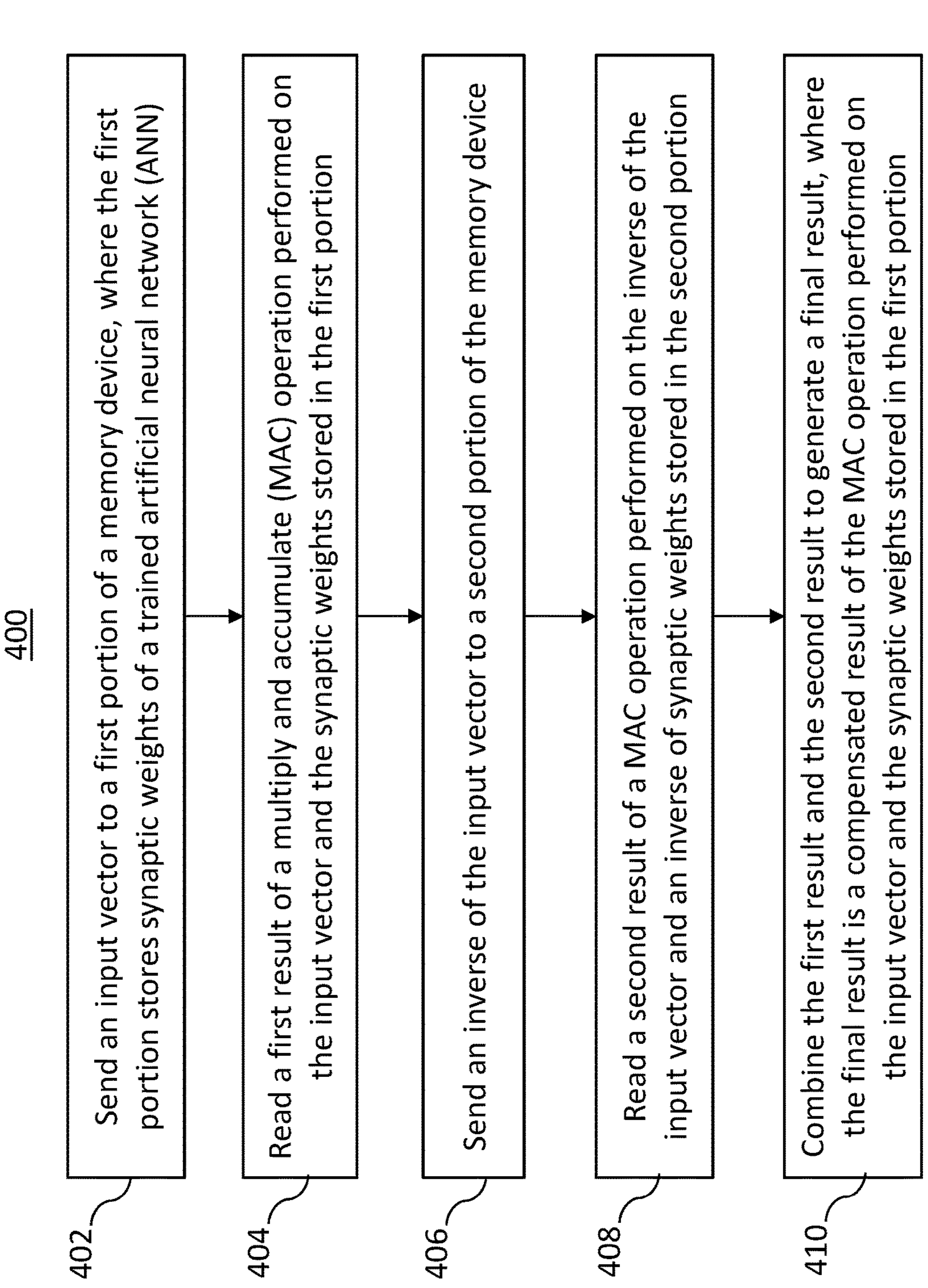
FIG. 4 is a flow diagram illustrating a method for fixed asymmetry compensation for multiply and accumulate operations in one embodiment.

FIG. 4 is a flow diagram illustrating a method for fixed asymmetry compensation for multiply and accumulate operations in one embodiment. The process 400 in FIG. 4 may be implemented using, for example, device 114 discussed above. Process 400 may include one or more operations, actions, or functions as illustrated by one or more of blocks 402, 404, 406, 408 and/or 410. Although illustrated as discrete blocks, various blocks may be divided into additional blocks, combined into fewer blocks, eliminated, performed in different order, or performed in parallel, depending on the desired implementation.

Process 400 can begin at block 402. At block 402, a processor (e.g., processor 110 in FIG. 1) can send an input vector to a first portion of a memory device. The first portion can store synaptic weights of a trained artificial neural network (ANN). Process 400 can proceed from block 402 to block 404. At block 404, the processor can read a first result of a multiply and accumulate (MAC) operation performed on the input vector and the synaptic weights stored in the first portion.

Process 400 can proceed from block 404 to block 406. At block 406, the processor can send an inverse of the input vector to a second portion of the memory device. Process 400 can proceed from block 406 to block 408. At block 408, the processor can read a second result of a MAC operation performed on the inverse of the input vector and an inverse of synaptic weights stored in the second portion.

Process 400 can proceed from block 408 to block 410. At block 410, the processor can combine the first result and the second result to generate a final result. The final result can be a compensated result of the MAC operation performed on the input vector and the synaptic weights stored in the first portion. In one embodiment, the processor can combine the first result and the second result by averaging the first result and the second result to generate the final result.

In one embodiment, the memory device can include a plurality of memory elements arranged into a plurality of memory blocks. The first portion can include a first set of memory elements in each memory block among the plurality of memory blocks. The second portion can include a second set of memory elements in each memory block among the plurality of memory blocks. In one embodiment, the first set of memory elements can include a first pair of memory elements, and the second set of memory elements can include a second pair of memory elements. In one embodiment, the memory device can be an analog non-volatile memory device.

In one embodiment, the processor can enable the first portion of the memory device, and sending the input vector to the first portion can be performed in response to enabling the first portion. The processor can, in response to reading the first result, disable the first portion. The processor can, in response to disabling the first portion, enable the second portion. The processor can further enable the second portion of the memory device, and sending the inverse of the input vector to the second portion is performed in response to enabling the second portion.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

As used herein, a "module" or "unit" may include hardware (e.g., circuitry, such as an application specific integrated circuit), firmware and/or software executable by hardware (e.g., by a processor or microcontroller), and/or a combination thereof for carrying out the various operations disclosed herein. For example, a processor or hardware may include one or more integrated circuits configured to perform function mapping or polynomial fits based on reading currents outputted from one or more of the output lines of the crossbar array at different time points, and/or apply the function to subsequent outputs to correct or compensate for temporal conductance variations in the crossbar array. The same or another processor may include circuits configured to input activation vectors encoded as electric pulse durations and/or voltage signals across the input lines for the crossbar array to perform its operations.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A memory device comprising:

a plurality of memory elements arranged into a plurality of memory blocks, wherein each memory block includes:

a first set of memory elements of the plurality of memory elements, the first set of memory elements configured to store a synaptic weight of a trained artificial neural network (ANN); and a second set of memory elements of the plurality of memory elements, the second set of memory elements configured to store an inverse of the synaptic weight stored in the first set of memory elements, wherein:

the first set of memory elements are further configured to:

receive a vector element among an input vector; and perform a first multiply and accumulate (MAC) operation on the vector element and the synaptic weight;

the second set of memory elements are further configured to:

receive an inverse of the vector element; and perform a second MAC operation on the inverse of the vector element and the inverse of the synaptic weight.

2. The memory device of claim 1, wherein the plurality of memory elements are analog non-volatile memory elements.

3. The memory device of claim 1, wherein:

the first set of memory elements includes a first pair of memory elements; and the second set of memory elements includes a second pair of memory elements.

4. The memory device of claim 1, wherein the first set of memory elements and the second set of memory elements are enabled separately to perform the first MAC operation and the second MAC operation.

5. The memory device of claim 1, wherein:

each one of the plurality of memory elements is connected to a switch;

switches of the first set of memory elements in the memory block are connected to a first control line; and switches of the second set of memory elements in the memory block are connected to a second control line.

6. A method comprising:

sending, by a processor, an input vector to a first portion of a memory device including a plurality of memory elements arranged into a plurality of memory blocks, wherein the first portion includes a first set of memory elements in each memory block among the plurality of memory blocks, and the first set of memory elements stores synaptic weights of a trained artificial neural network (ANN);

reading, by the processor, a first result of a multiply and accumulate (MAC) operation performed on the input vector and the synaptic weights stored in the first portion;

sending, by the processor, an inverse of the input vector to a second portion of the memory device, wherein the second portion includes a second set of memory elements in each memory block among the plurality of memory blocks, and the second set of memory elements stores inverse of the synaptic weights stored in the first set of memory elements;

reading, by the processor, a second result of a MAC operation performed on the inverse of the input vector and an inverse of synaptic weights stored in the second portion; and combining, by the processor, the first result and the second result to generate a final result, wherein the final result is a compensated result of the MAC operation performed on the input vector and the synaptic weights stored in the first portion.

7. The method of claim 6, further comprising:

enabling, by the processor, the first portion of the memory device, wherein sending the input vector to the first portion is performed in response to enabling the first portion; and enabling, by the processor, the second portion of the memory device, wherein sending the inverse of the input vector to the second portion is performed in response to enabling the second portion.

8. The method of claim 7, further comprising:

in response to reading the first result, disabling, by the processor, the first portion; and in response to disabling the first portion, enabling, by the processor, the second portion.

9. The method of claim 6, wherein:

the first set of memory elements includes a first pair of memory elements; and the second set of memory elements includes a second pair of memory elements.

10. The method of claim 6, wherein the memory device is an analog non-volatile memory device.

11. The method of claim 6, wherein combining the first result and the second result comprises averaging the first result and the second result to generate the final result.

12. A system comprising:

a memory device including a plurality of memory elements arranged into a plurality of memory blocks, wherein each memory block includes:

a first set of memory elements of the plurality of memory elements, the first set of memory elements configured to store a synaptic weight of a trained artificial neural network (ANN); and a second set of memory elements of the plurality of memory elements, the second set of memory elements configured to store an inverse of the synaptic weight stored in the first set of memory elements;

a processor configured to:

send an input vector to a first portion of the memory device including the first set of memory elements that stores, the synaptic weights;

read a first result of a multiply and accumulate (MAC) operation performed on the input vector and the synaptic weights stored in the first portion;

send an inverse of the input vector to a second portion of the memory device including the second set of memory elements that stores the inverse of the synaptic weight;

read a second result of a MAC operation performed on the inverse of the input vector and an inverse of synaptic weights stored in the second portion; and combine the first result and the second result to generate a final result, wherein the final result is a compensated result of the MAC operation performed on the input vector and the synaptic weights stored in the first portion.

13. The system of claim 12, wherein the processor is configured to:

enable the first portion of the memory device, wherein sending the input vector to the first portion is performed in response to the first portion being enabled; and enable the second portion of the memory device, wherein sending the inverse of the input vector to the second portion is performed in response to the second portion being enabled.

14. The system of claim 13, wherein the processor is configured to:

in response to reading the first result, disable the first portion; and in response to disabling the first portion, enable the second portion.

15. The system of claim 12, wherein:

the first set of memory elements includes a first pair of memory elements; and the second set of memory elements includes a second pair of memory elements.

16. The system of claim 12, wherein the memory device is an analog non-volatile memory device.

17. The system of claim 12, wherein the processor is configured to combine the first result and the second result by averaging the first result and the second result to generate the final result.

* * * * *